Oct. 27, 1925.
J. MORGENSTERN ET AL
1,559,273
OUTLET BOX STRUCTURE
Filed Sept. 11, 1922
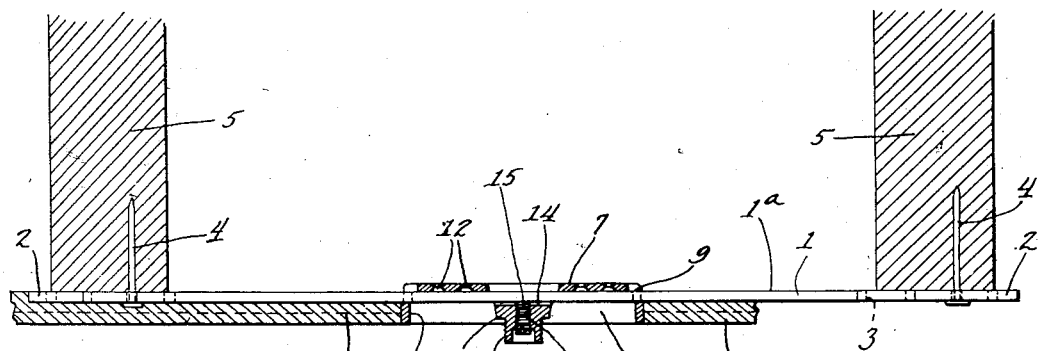
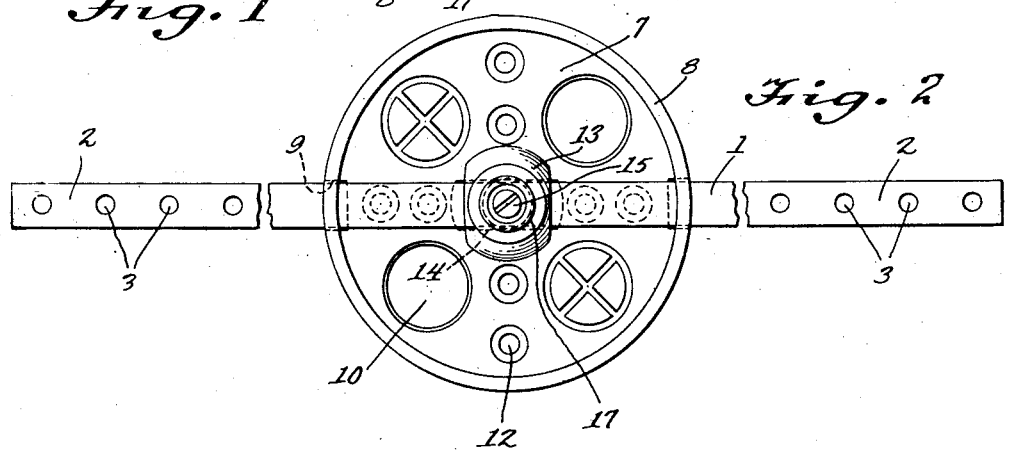
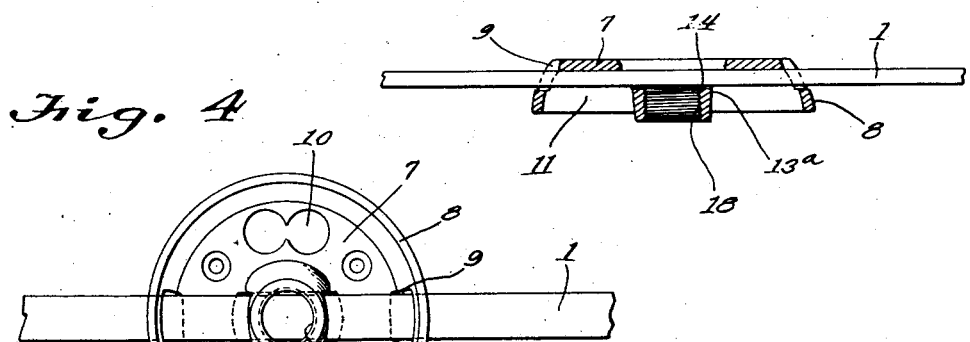
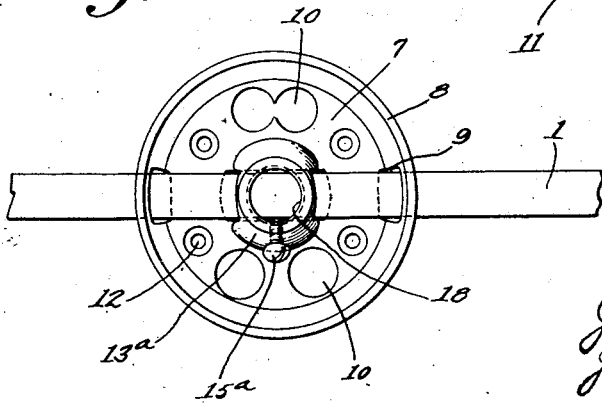
Inventors
Joseph Morgenstern
and
Joseph G. Raquette
By Brockett & Hyde
Attorneys Patented Oct. 27, 1925.

1,559,273

UNITED STATES PATENT OFFICE.

JOSEPH MORGENSTERN AND JOSEPH G. RAQUETTE, OF CLEVELAND, OHIO; SAID MORGENSTERN ASSIGNOR TO THE SILVER AND MORGENSTERN ELECTRIC COMPANY, OF CLEVELAND, OHIO.

OUTLET-BOX STRUCTURE.

Application filed September 11, 1922. Serial No. 587,538.

*To all whom it may concern:*

Be it known that we, JOSEPH MORGENSTERN and JOSEPH G. RAQUETTE, citizens of the United States, residing at Cleveland, in the county of Cuyahoga and State of Ohio, have invented certain new and useful Improvements in Outlet-Box Structures, of which the following is a specification.

This invention relates to an outlet box structure, comprising an outlet box and support therefor.

In the installation of an outlet box structure in the wall or ceiling of a room, for the support of electric switches, lamp sockets, electroliers, etc., the top of the box is usually attached to a metal strip or bar which is secured to adjacent studding or joists of the building. If said bar is secured to the lower horizontal surfaces of the ceiling joists, for example, the lower portion of the outlet box will extend below the finished ceiling, assuming that said box is of sufficient depth to properly receive the switches, sockets, etc., which arrangement is unsightly in appearance and objectionable for that and other reasons. If, in order to avoid this, the ends of said bar are secured to the opposite vertical surfaces of the joists, such as by bending the ends of the bar in the form of angle flanges, much time and labor are involved in the formation of said flanges, thereby materially increasing the cost of installation.

The object of the present invention is to provide an improved outlet box structure which is of minimum thickness, having regard to the necessary depth of the outlet box for the proper reception of the electric switches, sockets, etc., so that the outlet box support may be readily secured to the lower horizontal surfaces of the ceiling joists, or the inner surfaces of the vertical wall joists, without the necessity of having the outlet box extend below or beyond the finished ceiling or wall.

A further object of the invention is to provide such an outlet box structure in which the outlet box is readily adjustable on its support, the adjusting means being readily accessible even after installation, so that adjustment of said box on its support can be easily and quickly made at all times.

Further objects of the invention are in part obvious and in part will appear more in detail hereinafter.

In the drawing, which represents one suitable embodiment of the invention, Fig. 1 is a longitudinal sectional view of one preferred form of outlet box structure showing the outlet box support secured to two adjacent ceiling joists; Fig. 2 is a bottom plan view of this form of outlet box structure; Fig. 3 is a vertical sectional view of a modified outlet box structure; and Fig. 4 is a bottom plan view of the same.

Referring to the drawing, 1 represents a flat metal strip or bar, the end portions 2 of which are provided with a series of apertures 3, through which nails or other securing means 4 extend for securing said bar to the lower horizontal surfaces of adjacent studding or joists 5 in the ceiling of the building, to which surfaces lath and plaster 6 are also secured. The series of apertures 3 readily adapt said bar for use in places where the joists or studding are of different distances apart, so that said bar may at all times be quickly and easily secured in place.

Slidably mounted on said bar is one form of my improved outlet box, which comprises a base or body portion 7, and a depending, annular peripheral flange or side wall portion 8 having opposed slots 9 at the junction of the base and wall portions and through which said bar extends, fitting fairly snugly within the same. The base or body portion 7 of said box is provided with the usual openings or knockouts 10 for the passage of electric wires, etc., which are suitably secured in the chamber or cavity 11 of said outlet box. Preferably, said body portion may be provided with one or more apertures 12 through which nails or other securing means may extend, either for providing additional securing means for said outlet box, or to enable said box to be secured in place without the use of a supporting bar.

The base or body portion 7 of the outlet box is provided on its lower side with a depending stud portion 13, preferably formed integral therewith and provided adjacent the base portion 7 with a rectangular opening 14, in alignment with the slots 9 in the flange or wall portion 8, and through which extends the supporting bar 1. Said stud portion 13 is provided with any suitable means for adjustably securing the outlet box on its supporting bar 1, the means shown in Figs. 1 and 2 being a set screw 15 which extends through a central, longitudinal threaded opening 16 in said stud portion and engages the lower horizontal surface of the supporting bar 1. Said set screw 15 is readily accessible from below at all times, so that adjustment of the outlet box on its supporting bar can be easily and quickly made even after the installation of said outlet box structure.

In the modification shown in Fig. 3, the adjusting means is a set screw 15ª which extends through an inclined opening in the side of the stud portion 13ª and engages one of the surfaces of the supporting bar 1. Said set screw 15ª is also obviously readily accessible from below, so that said outlet box may be readily adjusted on its support after installation of this outlet box structure.

In the outlet box structures here shown, the stud portion of the outlet box is preferably so constructed as to form a support for an electrolier or the like, the outer end portion being formed as a hollow threaded plug 17, as in Figs. 1 and 2, or as a threaded socket 18, as in the modification shown in Fig. 3.

It is to be noted that the dimension from the outer edge of the wall portion to the opposite or upper face 1ª of the bar 1 is substantially the same as the thickness of the lath and plaster, as clearly indicated in Fig. 1 of the drawing.

What we claim is:—

1. In combination, a chambered outlet box provided with a stud portion within the chamber thereof and having an opening, said outlet box being also provided with a wall portion having opposed openings in alignment with the opening in said stud portion, and a supporting bar extending through all of said openings.

2. In combination, a chambered outlet box provided with a stud portion within the chamber thereof and having an opening, and a supporting bar extending through said opening and the chamber of said box, and means for securing said bar in said opening.

3. In combination, a chambered outlet box provided with a stud portion within the chamber thereof and having an opening, a supporting bar extending through said opening and the chamber of said box, and a set screw for securing said bar in said opening.

4. In combination, a chambered outlet box provided with a stud portion within the chamber thereof and having an opening, a supporting bar extending through said opening and the chamber of said box, and a set screw secured in said stud portion and engaging said supporting bar, said set screw being accessible from the bottom of said outlet box.

5. In combination, an outlet box structure comprising a box having base and side wall portions, the latter being provided with supporting bar openings adjacent the base portion, and a supporting bar adjustably held in said openings, the dimension from the outer edge of the wall portion to the opposed face of the supporting bar being substantially equal to the tolerance for lath and plaster.

In testimony whereof we hereby affix our signatures.

JOSEPH MORGENSTERN.
JOSEPH G. RAQUETTE.